United States Patent
Davies

(10) Patent No.: US 9,290,160 B2
(45) Date of Patent: Mar. 22, 2016

(54) WINDSCREEN CLEARING SYSTEM FOR A VEHICLE

(71) Applicant: Jaguar Land Rover Limited, Coventry (GB)

(72) Inventor: Christopher Davies, Coventry (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/387,432

(22) PCT Filed: Mar. 22, 2013

(86) PCT No.: PCT/EP2013/056084
§ 371 (c)(1),
(2) Date: Sep. 23, 2014

(87) PCT Pub. No.: WO2013/139967
PCT Pub. Date: Sep. 26, 2013

(65) Prior Publication Data
US 2015/0066293 A1    Mar. 5, 2015

(30) Foreign Application Priority Data
Mar. 23, 2012 (GB) .................................. 1205093.6

(51) Int. Cl.
*B60S 1/58* (2006.01)
*B60S 1/48* (2006.01)
(Continued)

(52) U.S. Cl.
CPC .............. *B60S 1/583* (2013.01); *B60S 1/0862* (2013.01); *B60S 1/0874* (2013.01); *B60S 1/0885* (2013.01);
(Continued)

(58) Field of Classification Search
CPC ...... B60S 1/583; B60S 1/0885; B60S 1/0874; B60S 1/481; B60S 1/0862; B60W 40/09; G06K 9/2018; G06K 9/00832
USPC ............................................................ 701/36
See application file for complete search history.

(56) References Cited

U.S. PATENT DOCUMENTS 4,999,550 A * 3/1991 Jones .............................. 318/50
6,242,876 B1 * 6/2001 Thompson .................... 318/444
(Continued)

FOREIGN PATENT DOCUMENTS

DE         196 44 553 A1    4/1998
DE    10 2008 052 442 A1    6/2009
(Continued)

OTHER PUBLICATIONS

International Search Report, PCT/EP2013/056084, May 14, 2013, 5 pages.
(Continued)

*Primary Examiner* — Rodney Butler
*Assistant Examiner* — Anne Mazzara
(74) *Attorney, Agent, or Firm* — Myers Bigel & Sibley

(57) ABSTRACT

A system (80) for a vehicle comprising a rear windscreen (20) and a rear windscreen wiper (26/28), the system (80) comprising one or more tracking sensors (30) and a control unit (50); the one or more tracking sensors (30) being coupled to the control unit (50) and being configured to monitor the behavior of a driver of the vehicle and to issue data to the control unit, the control unit (50) and/or the one or more tracking sensors (30) being arranged to make a positive determination that said monitored behavior is indicative of a requirement to look through the rear windscreen (20) of the vehicle and in dependence on making said positive determination, the control unit (50) is configured to activate the rear windscreen wiper (26/28) to wipe the rear windscreen (20) and/or to activate a rear windscreen washer system.

14 Claims, 4 Drawing Sheets

(51) Int. Cl.
  *B60W 40/09* (2012.01)
  *B60S 1/08* (2006.01)
  *G06K 9/00* (2006.01)
  *G06K 9/20* (2006.01)

(52) U.S. Cl.
  CPC ............... *B60S 1/481* (2013.01); *B60W 40/09* (2013.01); *G06K 9/00832* (2013.01); *G06K 9/2018* (2013.01)

(56) References Cited

U.S. PATENT DOCUMENTS

| | | | |
|---|---|---|---|
| 6,724,920 B1 * | 4/2004 | Berenz et al. | 382/118 |
| 6,766,036 B1 | 7/2004 | Pryor | |
| 2005/0063565 A1 | 3/2005 | Nagaoka et al. | |

FOREIGN PATENT DOCUMENTS

| | | |
|---|---|---|
| EP | 0 691 249 A1 | 1/1996 |
| EP | 0 932 533 A1 | 5/1998 |
| EP | 1 449 727 A2 | 8/2004 |
| GB | 2 371 669 A | 7/2002 |
| JP | 07-117634 | 5/1995 |
| JP | 08-058302 | 3/1996 |
| JP | 2000-047691 A | 2/2000 |
| JP | 2003-228395 A | 8/2003 |
| JP | 2010-064640 | 3/2010 |
| WO | WO 02/08023 A2 | 1/2002 |

OTHER PUBLICATIONS

Combined Search and Examination Report, Application No. GB1205093.6, Jul. 9, 2012, 5 pages.

Office Action, Japanese Patent Application No. 2015-502239, Jan. 5, 2016, 6 pages.

* cited by examiner

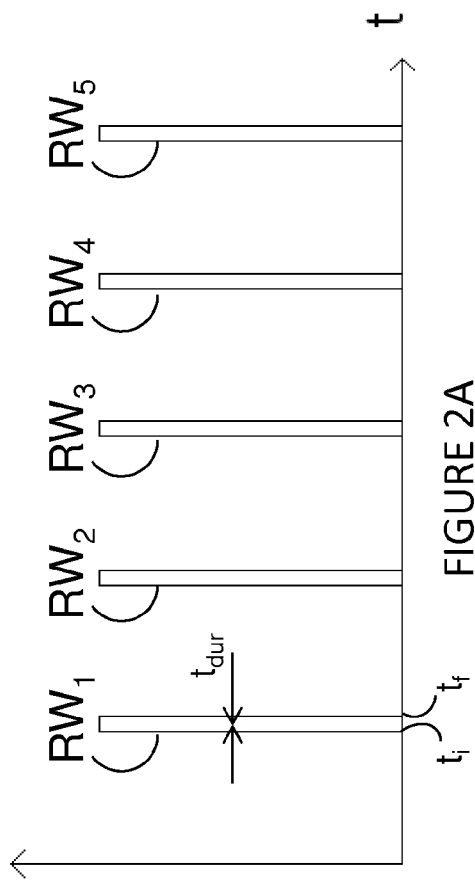
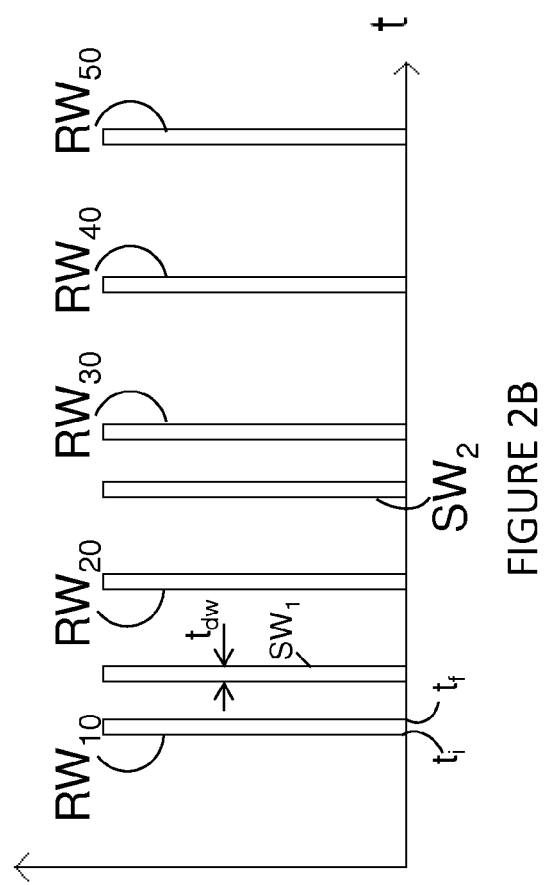

WINDSCREEN CLEARING SYSTEM FOR A VEHICLE

RELATED APPLICATIONS

This application is a 35 U.S.C. §371 national stage application of PCT Application No. PCT/EP2013/056084, filed on Mar. 22, 2013, which claims priority from Great Britain Patent Application No. 1205093.6, filed Mar. 23, 2012, the contents of which are incorporated herein by reference in their entireties. The above-referenced PCT International Application was published in the English language as International Publication No. WO 2013/139967 A1 on Sep. 26, 2013.

TECHNICAL FIELD

The present invention relates to a windscreen wiper system for a vehicle and a vehicle comprising such a system and particularly, but not exclusively, to a rear windscreen wiper system that operates automatically in response to detecting eye-movement of a driver of the vehicle toward a rear-view mirror. Aspects of the invention relate to a system, to a rear windscreen wiper mechanism, to a vehicle and to a method.

BACKGROUND

Vehicles, such as cars are often provided with one or more rear windscreen wipers that can be switched on and off by the driver of the vehicle. Current rear windscreen wipers are operated using a manual control switch that is typically positioned on a control stalk located close to the steering wheel. Current windscreen wiper control switches allow for the rear windscreen wiper to operate in: an intermittent on mode; or an off mode.

The frequency of operation of the rear windscreen wiper may be a pre-programmed frequency that is the same irrespective of vehicle circumstance. Alternatively, the frequency of operation of the rear windscreen wiper may be determined in dependence upon the drive speed of the vehicle, such that with increasing vehicle drive speed, the rear wiper is activated more frequently. In current wiper systems, the speed at which the wiper moves across the rear windscreen is typically maintained at the same value irrespective of the frequency with which the wiper is activated.

A problem that is encountered with current rear wiper systems is that, when a driver decides to observe the environment behind the vehicle by looking through the rear windscreen, (typically using a rear-view mirror), the rear windscreen may not be wiped and may be obscured despite the rear windscreen wiper having been switched on normally by the driver. This is because the timing of the driver looking through the rear-windscreen may be in between wipes of the rear windscreen the two being entirely independent of each other. This can be disadvantageous and often leads to the driver manually adjusting the wiper control switch on the control stalk to initiate a single wipe. Whilst the driver then knows that the rear windscreen has just been cleared and the driver can then observe the environment behind the vehicle, a delay has been incurred which may be disadvantageous. Additionally to operate the control switch the driver may have looked down. Whilst this may only have been a momentary action it would be preferred if the driver did not have to take such action. This is especially so in rainy conditions where screen wipers are required. Furthermore, the driver may have to repeatedly make the effort to "manually" cause the wipers to clear the rear windscreen as the vehicle is driven in rainy conditions.

It is against this background that the present invention has been conceived. Embodiments of the invention may provide an improvement in the field of windscreen wiper systems, more specifically but not exclusively, in the field of rear windscreen wiper systems. Other aims and advantages of the invention will become apparent from the following description, claims and drawings.

SUMMARY

Aspects of the invention provide a rear windscreen wiper, a wiper system, a vehicle and a method as claimed in the appended claims.

According to a first aspect of the invention, for which protection is sought, there is provided a system for a vehicle comprising a rear windscreen and a rear windscreen wiper, the system comprising one or more tracking sensors and a control unit; the one or more tracking sensors being coupled to the control unit and being configured to monitor the behaviour of a driver of the vehicle and to issue data to the control unit, the control unit and/or the one or more tracking sensors being arranged to make a positive determination that said monitored behaviour is indicative of a requirement to look through the rear windscreen of the vehicle and in dependence on making said positive determination, the control unit is configured to activate the rear windscreen wiper to wipe the rear windscreen and/or to activate a rear windscreen washer system.

According to another aspect of the invention for which protection is sought there is provided a controller for a vehicle having a rear windscreen wiper and a monitoring apparatus for monitoring a driver behaviour, the controller being configured to receive data from the monitoring apparatus indicative of a driver requirement to look through the rear windscreen of the vehicle and, in dependence thereon, to activate the rear windscreen wiper to wipe the rear windscreen and/or to activate a rear windscreen washer system.

The system may comprise a rear wiper motor coupled to the control unit and coupled to the rear windscreen wiper and wherein the control unit being configured to activate the rear windscreen wiper to wipe the rear windscreen, in dependence on the system making said positive determination.

The one or more tracking sensors may comprise a tracking sensor on or within a rear-view mirror, and/or a tracking sensor on or within an instrument panel of the vehicle, and/or a tracking sensor installed on or within the head lining of the vehicle; and/or a tracking sensor in or on a dashboard of the vehicle; and/or a tracking sensor in or on an A-pillar of the vehicle; and/or a tracking sensor in or on the courtesy light console of the vehicle; and/or a tracking sensor on or in a steering wheel of the vehicle or a steering column of the steering wheel.

The one or more tracking sensors may comprise: a camera, an infra-red sensor and/or another optical sensor.

A rear windscreen wiper control switch may be provided to control whether the rear windscreen wiper is ON, OFF or INTERMITTENTLY ON and where, in an ON or INTERMITTENTLY ON setting, the control unit being configured to operate the rear windscreen wiper at a fixed frequency ($f_{ON}$, $f_{INT}$).

The control unit may be configured to operate the rear windscreen wiper in response to making a positive determination only when the rear windscreen wiper control switch is in an ON position, or irrespective of the position of a rear windscreen wiper control switch; or only when the position of a rear windscreen wiper control switch is in an INTERMITTENT ON position.

Additionally or alternatively, the control unit may be configured to operate the rear windscreen wiper at a fixed frequency ($f_{INT}$) and wherein the control unit is configured to operate the rear windscreen wiper in response to making a positive determination only when the rear windscreen wiper control switch is in an INTERMITTENT ON position.

The system may comprise a rear-view mirror and/or a display screen showing a real-time video stream from a rear windscreen camera and wherein the one or more tracking sensors are configured to track that the driver's gaze is being directed toward or is directed at the rear-view mirror and/or display screen and thereby make said positive determination that monitored behaviour is indicative of a requirement to look through the rear windscreen of the vehicle.

According to a further aspect for which protection is sought, there is provided a vehicle comprising a rear windscreen, a rear windscreen wiper and a system according to any one of the foregoing paragraphs.

According to a further aspect of the invention for which protection is sought, there is provided a method of operating a rear windscreen wiper of a vehicle, the method comprising:
(i) monitoring the behaviour of a driver of a vehicle;
(ii) making a positive determination based upon said monitoring that the behaviour of the driver is indicative of a requirement to look through the rear windscreen of the vehicle; and in dependence thereon
(iii) activating the rear windscreen wiper; and/or
(iv) activating a rear windscreen washer.

Step (i) may comprise tracking the gaze of the driver; and/or tracking the driver eye movement; and/or tracking driver head movement.

According to yet a further aspect for which protection is sought there is provided a program for carrying out the method of the previous paragraphs.

According to a still further aspect for which protection is sought, there is provided a carrier medium carrying a program according to the foregoing paragraph.

According to yet a further aspect for which protection is sought there is provided a kit of parts for installation and/or assembly to a vehicle, the kit comprising: one or more tracking sensors and a carrier medium as defined above, the kit of parts configured such that when installed to a vehicle, a vehicle according to the relevant preceding paragraphs is formed.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which:

FIG. 2A is a graphical representation of the operation of the rear windscreen wiper of a known system;

FIG. 2B is a graphical representation of the operation of the rear windscreen wiper system illustrated in FIG. 1 according to a first optional configuration;

DETAILED DESCRIPTION OF EMBODIMENTS

Detailed descriptions of specific embodiments of the vehicles rear windscreen wiper systems and method of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the vehicles, rear windscreen wiper systems, and methods described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
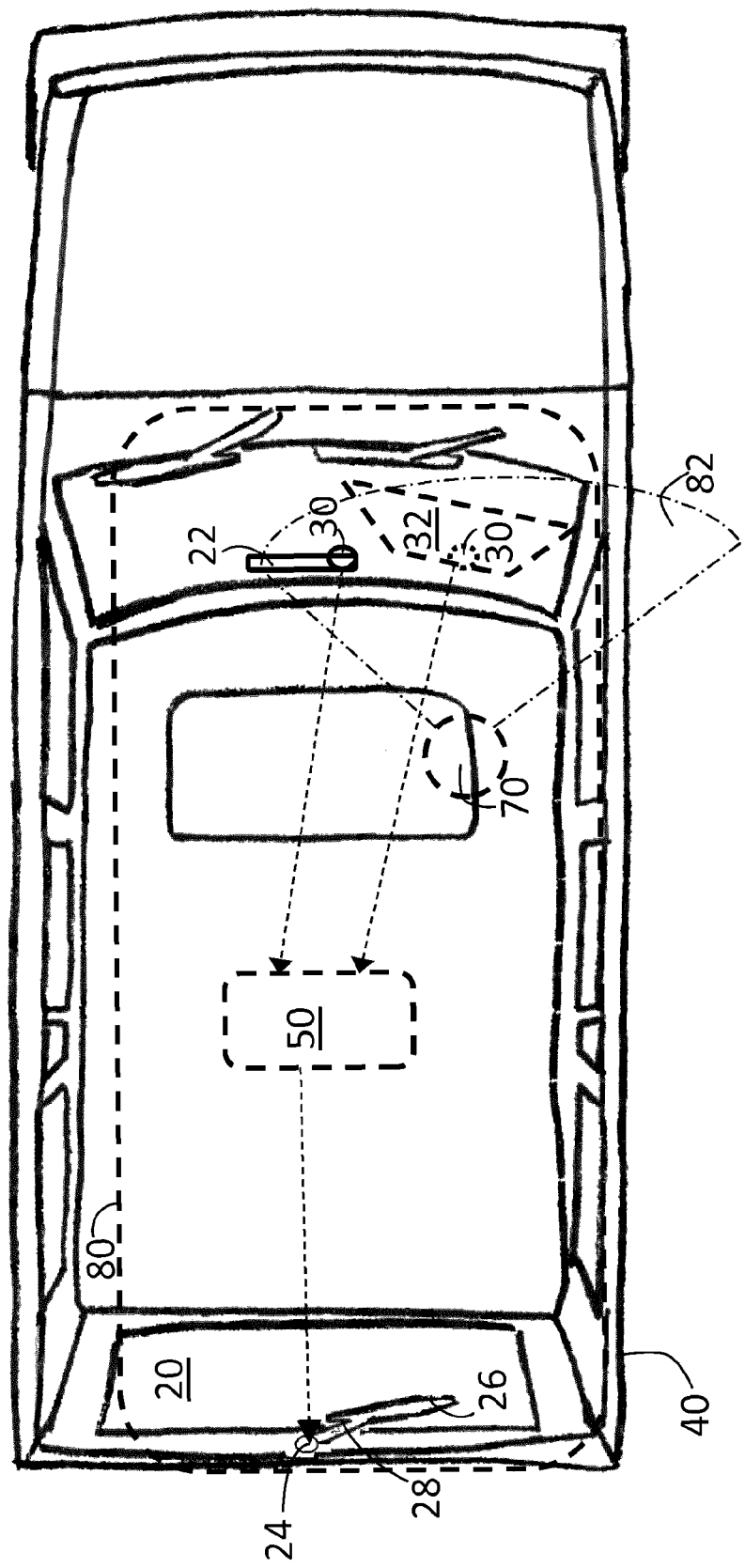
FIG. 1 is a vehicle having a rear windscreen wiper system according to an embodiment of the invention.

In FIG. 1 there is shown a vehicle 40 (which in this illustrated example is a car) comprising a rear windscreen 20 and a rear windscreen wiper system 80 (referred to in the foregoing as system 80). The system 80 optionally comprises: a rear wiper blade 26; a wiper arm 28; a wiper motor 24; a control unit 50; one or more tracking sensors 30; and a rear wiper control switch (not shown and also referred to as switch). Also illustrated in FIG. 1 is a driver's head 70; an instrument panel 32 on a dashboard of the vehicle 40 and a rear-view mirror 22.

The system 80 is configured such that the one or more tracking sensors 30 is configured to monitor the driver's behaviour, specifically, albeit optionally, the movement and direction of the driver's gaze. In the exemplary embodiment of the invention illustrated in FIG. 1 two tracking sensors 30 are provided, a first tracking sensor 30 is disposed on or within the instrument panel 32 and a second tracking sensor 30 is disposed on or within the rear-view mirror 22. Each tracking sensor 30 is positioned such that it is within and/or its range of detection is within a suitable range 82 to detect and track the gaze of a driver approximately toward the rear view mirror 22. Each tracking sensor 30 is preferably a sensor suitable for use in tracking the gaze of the driver, for example a camera, co-operable with the control unit 50 to perform gaze-tracking on the driver of the vehicle 40. Additionally or alternatively in other embodiments it is envisaged that the system 80 is configured to track eye movement and/or head movement and/or other suitable behavioural characteristics of the driver in order to reliably determine that a driver is looking in the rear-view mirror 22 or is likely to be about to look in the rear-view mirror. Eye tracking technology is well known and suitable components are available that can be used in the assembly of the system 80 of the presently described embodiment.

A notional viewing range 82 of the driver is depicted in dotted outline to illustrate (albeit in 2-d) a 3-dimensional viewing range 82 of the driver. When a driver intends to observe the environment to the rear of the vehicle 40, the driver's eyes may move in a manner that is indicative of the driver's intention to look through/at the rear view mirror 22. For example, the driver's eyes typically will sweep up and toward the rear view mirror 22. This behaviour and optionally more specifically tracking the driver's gaze, and further optionally other driver eye movement and/or other driver movement (for example head movement) is tracked and monitored by the one or more tracking sensors 30 (optionally in conjunction with the control unit 50). In response to data collected by and/or signals received from the one or more tracking sensors 30, the control unit 50 is configured to make a determination that the driver may be about to look into the rear view mirror 22 or is actually looking through/into the rear view mirror 22. In response to the control unit 50 (and/or the one or more sensors 30) making the determination that the driver may be about to look through the rear windscreen 20 or is looking through the rear windscreen 20 (hereafter referred to as a positive determination), the system 80 is configured automatically to cause the rear windscreen wiper 26 to wipe the rear windscreen 20, for example via a command issued by the control unit 50 to the electric motor 26 that drives the windscreen wiper 26. As such the system 80 automatically provides one or more wipes of the rear windscreen 20 in response to driver behaviour.

The automatic wipes that are performed in response to driver behaviour (hereafter referred to as supplementary wipes) may be performed in addition to the wipes that may otherwise be carried out by virtue of the rear-wiper control switch having been set to an ON mode. In some envisaged embodiments of the invention the supplementary wipes may cause a regular wipe to be cancelled. This may be due to the supplementary wipe occurring very close in time to the time when a regular wipe would any way have occurred. It is preferable if the system 80 is configured to control the wiper 26/28 such that the wiper 26/28 is able to complete a full return stroke across the rear windscreen 20 before attempting to carry out another wipe (either a regular wipe due to normal operation in the on mode or a supplementary wipe due to operation of the system 80). Alternatively where the system 80 determines that a supplementary wipe may be required the system 80 may be additionally configured to check whether a regular wipe of the rear windscreen 20 is about to occur within a certain defined time period and if a regular wipe is scheduled within that time limit, the system 80 will not attempt to cause an additional supplementary wipe.

Reference is now made to FIG. 2A wherein the state of operation of a rear-windscreen wiper of a known wiper system is graphically represented. In an ON mode of the rear wiper system, the system is configured to actuate a wiper blade 26 in a return sweep across the rear windscreen 20. The wipe may take up to about 2 s and wipes may be separated by a regular delay (which may be about 6 s) and wipes occur with a regular frequency f. The operation of a rear-wiper 26/28 in a known system is depicted graphically in FIG. 2A; the time period during which the wiper 26/28 is moving is illustrated by a rectangular peak. The duration of the wipe $t_{dur}$ is illustrated by the width of the peak; the wipe having an initiation or start time $t_i$ and a finishing or completion time $t_f$.

Reference is now made to FIG. 2B wherein an optional state of operation of a rear windscreen wiper 26/28 of the system 80 in a first optional configuration is graphically represented. With the system 80 in an ON mode, the system 80 is configured to actuate the wiper blade 26 in a return sweep across the rear windscreen 20 at regular intervals. In addition to the regular operation, supplementary wipes of the rear windscreen 20 may be caused as a result of a positive determination being made by the tracking sensors 30 and control unit 50. In FIG. 2B, it can be seen that immediately after the first regular wipe $RW.sub.10$ a first supplementary wipe $SW.sub.1$ occurs. The first supplementary wipe $SW.sub.1$ results directly from the tracking sensors 30 (optionally in co-operation with the control unit 50) making a positive determination that the driver is, or may be about to look in the rear-view mirror 22. A second regular wipe $RW.sub.20$ then occurs which is followed shortly thereafter by a second supplementary wipe $SW.sub.2$, which again results directly from the tracking sensors 30 and/or control unit 50 making a positive determination. Similarly to the illustration of the regular wipes in FIG. 2A using rectangular peaks, the supplementary wipe duration $t_{dur}$ is illustrated by the width or the rectangular peak having an initiation time $t_i$ and a completion time $t_f$.

Figure 2C:
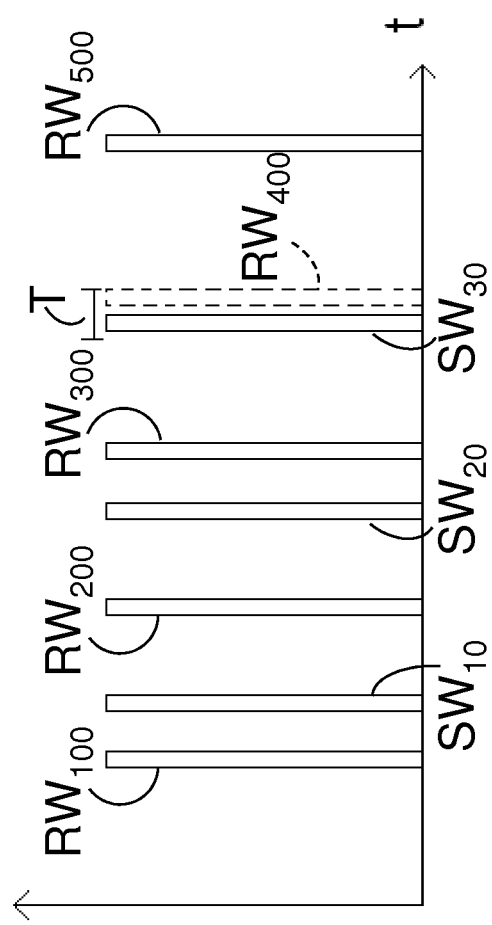
FIG. 2C is a graphical representation of the operation of the rear windscreen wiper system illustrated in FIG. 1 according to a second optional configuration.

Referring to FIG. 2C an optional state of operation of a rear-windscreen wiper 26/28 of the system 80 in a second optional configuration is graphically represented. With the system 80 in an ON mode, the system 80 is configured to actuate the wiper blade 26 in a return sweep across the rear windscreen 20 at regular intervals. In addition to the regular operation, supplementary wipes of the rear windscreen 20 may be caused as a result of a positive determination being made by the tracking sensors 30 and system 80. In FIG. 2C, it can be seen that a third supplementary wipe $SW_{30}$ occurs within a time period threshold 'T'. As a result of a third supplementary wipe $SW_{30}$ being initiated close to the initiation time of a regular wipe ($RW_{400}$), the regular wipe $RW_{400}$ that would have otherwise occurred (see $RW_{400}$ in dotted outline) is caused to be cancelled. The control unit 50 may be programmed to cancel the regular wipe $RW_{400}$ and issue a command to the electric motor 26 (that drives the wiper arm 28) to prevent the regular wipe $RW_{400}$ from occurring. Alternatively, where the timing of a supplementary wipe overlaps with the initiation time or duration time of a regular wipe, the regular wipe sequence may be time shifted. Optionally, the time shifting of the regular wipe sequence may be determined relative to the initiation time or duration time of the supplementary wipe.

It can be appreciated that various changes may be made within the scope of the present invention, for example, in other embodiments of the invention it is envisaged that the wiper motor 24 is configured to operate at different speeds in order to perform faster wipes of the rear windscreen 20. In such envisaged embodiments each supplementary wipe may be carried out at a faster speed than a regular wipe in order to achieve rapid clearance of the rear-windscreen 20 to time the clearance of the rear windscreen 20 with the driver's observation through the rear windscreen 20 via the rear-view mirror 22. In such an embodiment the duration time $t_{dur}$ of a regular wipe RW, is greater than the duration time of a supplementary wipe SW.

In other envisaged embodiments, the system 80 may be enabled by a user of the vehicle 40 in replacement of regular intermittent or regular constant wiping such that the supplementary wipes are in fact the only wipes and no regular wipes occur.

In yet a further envisaged embodiment, data from a rain sensor (not shown) positioned on or behind the front windscreen 21 may be used to automatically turn on the rear windscreen wiper system 80 such that supplementary automatic wipes of the rear windscreen 20 occur in response to tracking of the driver's eye movement (or other behaviour) irrespective of the fact that the driver has not manually switched on the intermittent or constant regular rear wipe cycle. As such it will be understood that the system 80, that has been described, that has the capability to cause automatic screen wipes in response to gaze-tracking; eye-tracking; head-tracking; or other suitable tracking of the driver may be operable independently of a typical regular intermittent wiping system. It is preferable however that the two systems operate in a co-ordinated and co-operative manner to ensure that multiple commands to drive the wiper are compatible with one another.

It is envisaged that a wide variety of types of tracking sensor 30 may be suitable for use in a system 80 for tracking eye movement, head movement and/or other behavioural characteristics of a driver. For example one or more or a combination of: a camera; an infra-red sensor. Additionally it is envisaged that a wide variety of positions for the tracking sensor(s) 30 may be suitable for use in a system 80 in addition or in alternative to the positions illustrated schematically in FIG. 1. For example a tracking sensor 30 may be positioned in any one or more of the following no-exhaustive list of optional positions: in or on the rear view mirror 22; in or on the instrument panel; in or on the inner-roof lining (which may optionally monitor driver head rotation); in or on the head lining of the vehicle 40, preferably on the driver side; in or on the internal lining of the driver side door (preferably close to the top of the door); in or on the dash board; in or on the A-pillar; in or on the front windscreen 21; in or on the steering wheel; in or on a steering column or mounting of the steering wheel; and in or on the courtesy light console.

Whereas the afore list of exemplary and non-limiting positions for the one or more tracking sensors 30 are internal of the vehicle 40, in other envisaged embodiments one or more tracking sensors may optionally be suitably positioned externally.

Alternatively, it is envisaged in other embodiments that the rear windscreen wiper system 80 becomes operational only when the rear wiper control switch has been used to select an intermittent rear wiper operation. In such an embodiment, if the rear wiper control switch is OFF or in an ON CONSTANT mode, the rear windscreen wiper system 80 that can cause automatic initiations of the rear wiper 26/28 in response to detecting certain movements by the driver is not able to operate.

Furthermore, whereas the rear windscreen wiper system 80 described has particular beneficial application in a vehicle 40, it is within the scope of the present invention that where wipers are used to clear screens other than rear windscreens of a vehicle and that where the behaviour of a person who may require to look at or through the screen can be monitored, a system of the present invention may be beneficially employed to cause automatic wiping of that screen. For example, public information and advertisement screens are often provided outside where weather conditions may affect the legibility of information displayed on the screen. One or more tracking sensors could be installed on or within the screen to detect a user's presence and in response to that presence a wiper for the screen could be automatically deployed. In such an application the system may additionally comprise a sensor to determine whether the screen is obscured by dirt or moisture and only if the screen is so obscured would the wiper be operated.

In yet a further envisaged embodiment, an alternative means for the driver to view the environment to the rear of the vehicle may be provided. For example, in one embodiment rather than the driver looking toward a rear-view mirror to observe the environment to the rear of the vehicle the driver may look to an in-cabin display screen showing a live-feed from one or more cameras that may be positioned inside the vehicle and disposed to view the environment to the rear of the vehicle. As such, the system in such an embodiment is configured to monitor the driver's gaze and/or track the driver's eye movement and/or track other behavioural characteristics or the driver to make a positive determination that the driver is or is about look at the rear-vehicle-environment display screen (rather than toward a rear-view mirror). In yet other embodiments, other means for the driver to view the environment may be provided in addition to or alternatively to one or more cameras and/or one or more rear-view mirrors.

As an additional optional feature of any embodiment of the system for wiping a rear windscreen, the system is configured to automatically cause activation of a rear-washer system. In known vehicles, reservoirs are provided for storing water and screen wash and an actuator is provided to dispense water and screen wash from the reservoir onto the windscreens of the vehicle. Activation of the washer system typically also initiates a wipe of the screen using the wiper blade. Washer systems are, like known wiper systems activated by a control switch often disposed on a control stalk proximate the steering wheel. Manual triggering of the control switch by the driver is required to activate the washer system. The present invention according to a further optional aspect therefore provides a system configured to detect the presence of dirt on a windscreen and in combination with a determination that the driver is or may be about to observe the environment to the rear of the vehicle automatically causes activation of the washer system, timed with a supplementary or regular wipe of the windscreen to cause the windscreen to be wiped and cleaned. Optionally, the system may comprise a dirt sensor, which may be an optical based transducer capable of transmitting and receiving an optical signal. In dependence upon the amount of the optical signal that is reflected by the windscreen a determination regarding the how clean, clear or dirty the windscreen is can be made. When the rear windscreen is perfectly clear, a higher proportion of the optical signal will be reflected compared to when the rear windscreen is dirty (the dirty windscreen may absorb more of the optical signal). Other suitable sensors may be used disposed either internally and/or externally to monitor the clearness of the screen. One or more such sensors may be used and the control unit of the system may compare the data obtained from more than one sensor in reaching a determination as to whether activation of the washer system is required or not.

Figure 3:
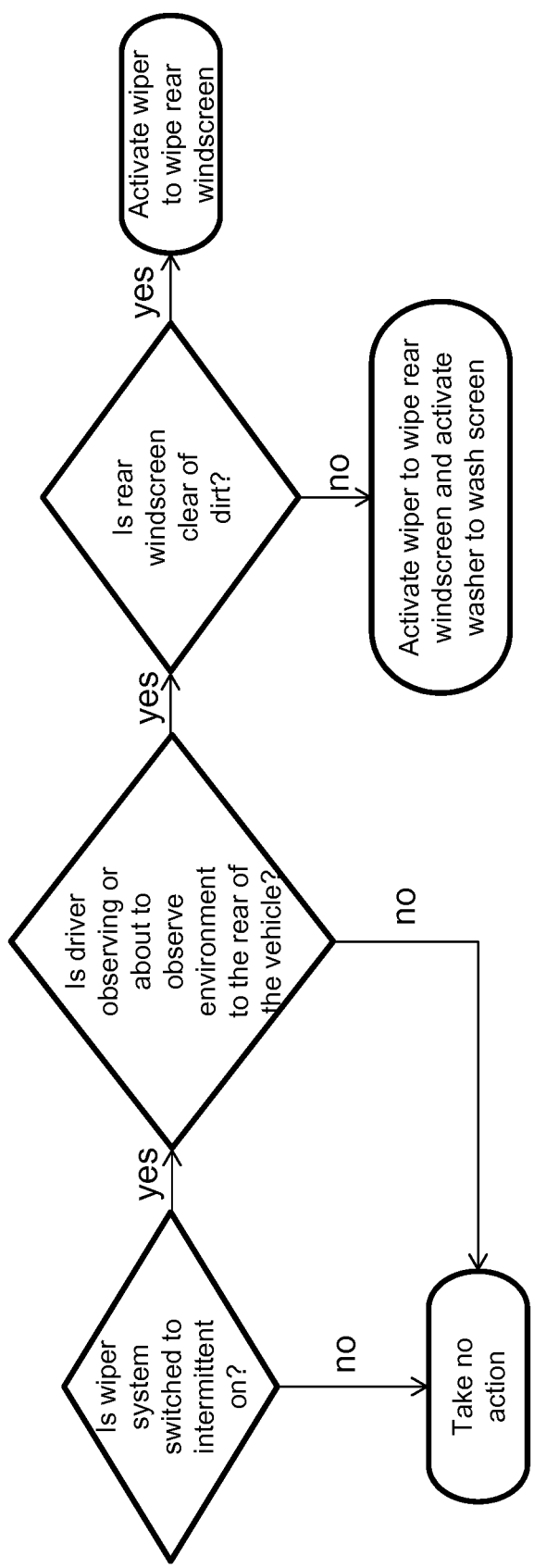
FIG. 3 is a flow-chart illustrating an algorithm optionally executed by a program running on a control unit according to a further optional configuration of a wiper clearing and cleaning system.

It will be understood that the format of an algorithm used by a system of the invention for determining whether to invoke a supplementary wipe and/or to invoke the actuator of a washer system may take many and various forms. By way of illustrative example only, in FIG. 3 a flow-chart illustrating schematically an optional exemplary algorithm that may be performed by the system according to an embodiment of the invention is provided. With reference to FIG. 3, the following sequence of decisions is illustrated:

FIG. 3 a flow-chart illustrating schematically an optional exemplary algorithm that may be performed by the system according to an embodiment of the invention is provided. With reference to FIG. 3, the following sequence of decisions is illustrated:

A: Is wiper system switched to intermittent on?
   if yes, then: go to B
   if no, then go to F
B: Is driver observing or about to observe environment to the rear of the vehicle (for example by means of a rear-view mirror or in car camera screen)?
   if yes, then: go to C
   if no, then go to F C: Is rear windscreen clear of dirt (as detected by dirt sensor)?
  if yes, then: go to D
  if no, then go to E
D: Activate wiper to wipe rear windscreen;
E: Activate wiper to wipe rear windscreen and activate washer to wash screen;
F: Take no action.

It is envisaged that automation of the wiper blade and/or washer system may be made in response to the driver's behaviour being indicative of his requirement to observe the environment to the rear of the vehicle and alternatively in response to other factors. For example, cleaning and/or clearing (by the washer and/or wiper systems respectively) may be activated not entirely in dependence on the driver looking toward a rear-view mirror or in-cabin display screen showing real-time footage of the environment to the rear of the vehicle. Indeed, some drivers may look over their shoulder in order to directly look though the rear-screen, the sensors 30 tracking driver behaviour may optionally be configured to detect a rotation of the driver's head and from that make a positive determination to activate the windscreen wiper and/or washer in response to such a driver movement. However, optionally, automatic activation of the rear windscreen wiper and/or washer may occur if the vehicle is put into reverse driver gear and the rear windscreen is not clean (dirty) as sensed by a sensor of the system as described above.

It will be understood from the description of the various envisaged embodiments that a system installed in a vehicle may comprise a variety of different functions and therefore it is also contemplated that a vehicle may be provided with the facility to select certain user options. In an optional embodiment, the system comprises an in-cabin control screen and optionally a look-up menu (which may optionally be accessed via a touch screen). Through the in-cabin control screen the user may be able to:

select the wiper control system to operate in a continuous ON operation; and optionally:
  select the wipe speed;
  select the wipe frequency;
  select automatic washer activation in response to driver behaviour; and/or
  select automatic wiper activation in response to driver behaviour;
 select the wiper control system to operate in an intermittent ON operation; and optionally:
  select the wipe speed;
  select the wipe frequency;
  select automatic washer activation in response to driver behaviour; and/or
  select automatic wiper activation in response to driver behaviour;
 select the wiper control system to NOT operate in an intermittent ON or continuous ON operation; and optionally:
  select automatic washer activation in response to driver behaviour; and/or
  select automatic wiper activation in response to driver behaviour.

It will be understood that the term windscreen is synonymous with the term windshield.

Furthermore, where reference has been made to a requirement to look through the rear windscreen of the vehicle, it will be understood that this is synonymous with a requirement to observe the environment to the rear of the vehicle. Additionally it will be understood that a driver's behaviour that is indicative of such a requirement may include the driver directly looking through the rear windscreen (for example by turning his head) and the driver indirectly looking through the rear windscreen (for example by observing a mirror or display screen in-front of the driver).

The invention claimed is:

1. A system for a vehicle comprising a rear windscreen and a rear windscreen wiper, the system comprising:
  one or more tracking sensors and a control unit, wherein the one or more tracking sensors are coupled to the control unit and are configured to monitor behaviour of a driver of the vehicle and to issue data to the control unit,
  wherein the control unit and/or the one or more tracking sensors are arranged to make a positive determination that monitored behaviour of the driver is indicative of a requirement to look through the rear windscreen of the vehicle and in dependence on making said positive determination, the control unit is configured to activate the rear windscreen wiper to wipe the rear windscreen and/or to activate a rear windscreen washer system.

2. The system of claim 1, wherein the vehicle comprises a rear wiper motor coupled to the control unit and coupled to the rear windscreen wiper and wherein the control unit is configured to activate the rear windscreen wiper to wipe the rear windscreen, in dependence on the system making said positive determination.

3. The system of claim 1, wherein the one or more tracking sensors comprises a tracking sensor on or within one or more of the following: a rear-view mirror of the vehicle, an instrument panel of the vehicle, a head lining of the vehicle, a dashboard of the vehicle, an A-pillar of the vehicle, a courtesy light console of the vehicle, and a steering wheel of the vehicle or a steering column of the steering wheel.

4. The system of claim 1, wherein the one or more tracking sensors comprises: a camera, an infra-red sensor and/or another optical sensor.

5. The system of claim 1, wherein a rear windscreen wiper control switch is provided to control whether the rear windscreen wiper is in an ON setting, OFF setting or INTERMITTENT ON setting, and where, in an ON or INTERMITTENT ON setting, the control unit is configured to operate the rear windscreen wiper at a fixed frequency ($f_{ON}$, $f_{INT}$).

6. The system of claim 5, wherein the control unit is configured to operate the rear windscreen wiper in response to making a positive determination only when the rear windscreen wiper control switch is in an ON position, or irrespective of the position of a rear windscreen wiper control switch, or only when the position of a rear windscreen wiper control switch is in an INTERMITTENT ON position.

7. The system of claim 5, wherein the control unit is configured to operate the rear windscreen wiper at a fixed frequency ($f_{INT}$) and wherein the control unit is configured to operate the rear windscreen wiper in response to making a positive determination only when the rear windscreen wiper control switch is in an INTERMITTENT ON position.

8. The system of claim 1, comprising a rear-view mirror and/or a display screen showing a real-time video stream from a rear windscreen camera, and wherein the one or more tracking sensors are configured to track that a gaze of the driver is being directed toward or is directed at the rear-view mirror and/or display screen and thereby make said positive determination that monitored behaviour is indicative of a requirement to look through the rear windscreen of the vehicle.

9. A vehicle comprising a rear windscreen, a rear windscreen wiper and the system of claim 1.

10. A method of clearing a rear windscreen of a vehicle, the method comprising:
- (i) monitoring behaviour of a driver of the vehicle;
- (ii) making a positive determination based upon said monitoring that the behaviour of the driver is indicative of a requirement to look through the rear windscreen of the vehicle; and in dependence thereon;
- (iii) activating a rear windscreen wiper; and/or
- (iv) activating a rear windscreen washer.

11. The method of claim 10, wherein step (i) comprises tracking a gaze of the driver, and/or tracking driver eye-movement, and/or tracking driver head movement.

12. The method of claim 11, wherein said tracking is performed by at least one of a camera, an infra-red sensor, and another optical sensor.

13. A non-transitory carrier medium storing a program thereon that is configured to carry out a method of clearing a rear windscreen of a vehicle, the method comprising:
- (i) monitoring behaviour of a driver of the vehicle;
- (ii) making a positive determination based upon said monitoring that the behaviour of the driver is indicative of a requirement to look through the rear windscreen of the vehicle; and in dependence thereon;
- (iii) activating a rear windscreen wiper; and/or
- (iv) activating a rear windscreen washer.

14. A kit of parts for installation and/or assembly to a vehicle, the kit comprising: one or more tracking sensors and a carrier medium configured to perform the following operations when executed by a control unit:
- (i) monitor behaviour of a driver of the vehicle;
- (ii) make a positive determination based upon said monitoring that the behaviour of the driver is indicative of a requirement to look through a rear windscreen of the vehicle; and in dependence thereon;
- (iii) activate a rear windscreen wiper; and/or
- (iv) activate a rear windscreen washer.

* * * * *